United States Patent [19]

Bendig et al.

[11] Patent Number: 4,796,416
[45] Date of Patent: Jan. 10, 1989

[54] PORTABLE SHREDDER/LAWN MOWER FOR GARDEN USE AND THE LIKE

[76] Inventors: Thomas J. Bendig; Donna A. Bendig, both of P.O. 26, Bruno, Saskatchewan, Canada, S0K 0S0

[21] Appl. No.: 85,774

[22] Filed: Aug. 17, 1987

[30] Foreign Application Priority Data

Aug. 29, 1986 [CA] Canada .................................. 517261

[51] Int. Cl.[4] ...................... B02C 18/10; A01D 55/18
[52] U.S. Cl. ...................................... 56/16.9; 56/13.4; 56/16.7; 241/101.1; 241/277
[58] Field of Search ...................... 56/16.9, 16.7, 16.4, 56/10.7, 13.4; 241/101 R, 101.1, 114, 227, 292.1

[56] References Cited

U.S. PATENT DOCUMENTS

| | | | |
|---|---|---|---|
| 2,737,003 | 3/1956 | Beers | 56/13.4 |
| 2,756,001 | 7/1956 | Kemp . | |
| 3,153,435 | 10/1964 | Ober . | |
| 3,240,247 | 3/1966 | Lautzenheiser . | |
| 3,412,770 | 11/1968 | Johnson . | |
| 3,527,278 | 9/1970 | Johnson | 56/16.7 |
| 3,593,930 | 7/1971 | Lautzenheiser . | |
| 3,674,220 | 7/1972 | Tupper et al. . | |
| 3,726,488 | 4/1973 | Aasland | 241/277 |
| 3,963,184 | 6/1976 | Grimm | 241/101.1 |
| 4,057,952 | 11/1977 | Brokaw | 56/16.9 |
| 4,161,096 | 7/1979 | Biberger | 56/13.4 |
| 4,283,018 | 8/1981 | Richard | 241/101.1 |
| 4,360,166 | 11/1982 | Biersack . | |
| 4,477,029 | 10/1984 | Green . | |

Primary Examiner—Douglas Hart
Attorney, Agent, or Firm—Stanley G. Ade; Murray E. Thrift; Adrian Battison

[57] ABSTRACT

The device includes a wheel mounted frame having a detachable base plate, when used as a shredder, a small engine on the upper side of the frame and an internal blade enclosure within said frame, a small chute to limit the intake and prevent overloading from occurring, and a discharge on the internal enclosure opposite to the intake or loading chute. Two cutting blades are mounted on the motor drive shaft which extends vertically into the internal enclosure, an upper blade having a downturned outer end portion to draw air in through the air intake chute and a lower blade radially spaced from the upper blade by 90 degrees and having an upturned outer end portion to prevent material from building up upon the base plate. When used as a lawnmower, the base plate is removed and a plurality of radially extending stabilizer rods is substituted thus providing an open base so that the lowermost cutting blade can engage the grass. In both cases a central bearing, either on the base plate or from which the stabilizing rods extend radially, supports the lower end of the driver shaft.

19 Claims, 2 Drawing Sheets

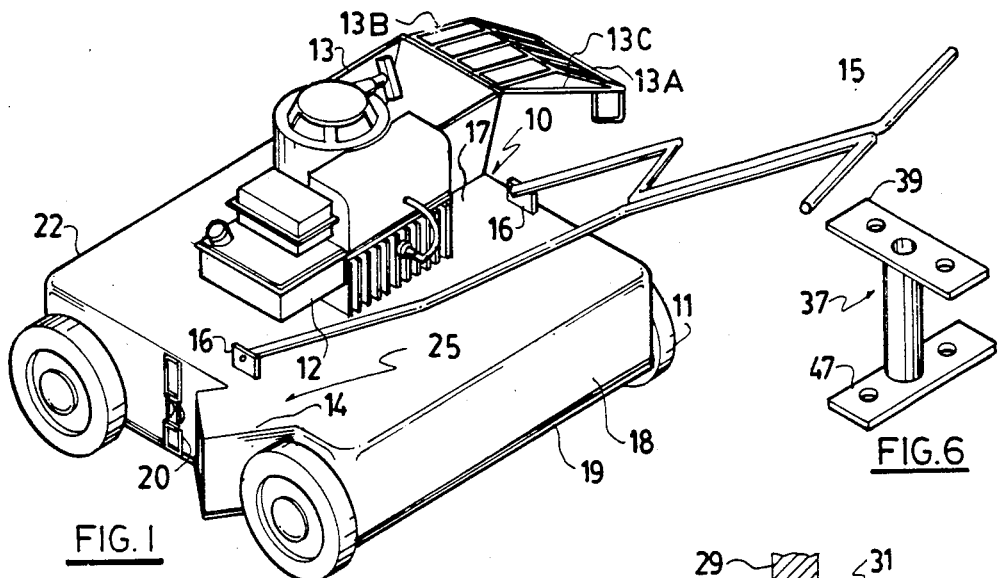
FIG.1
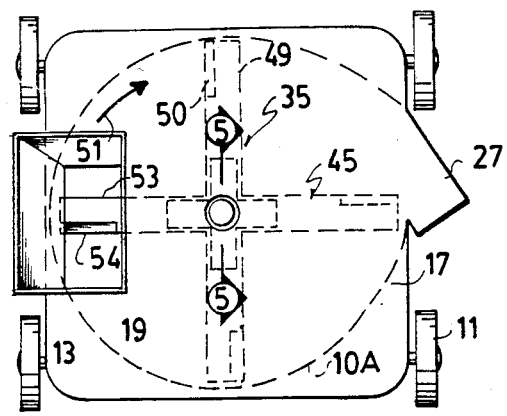
FIG.2
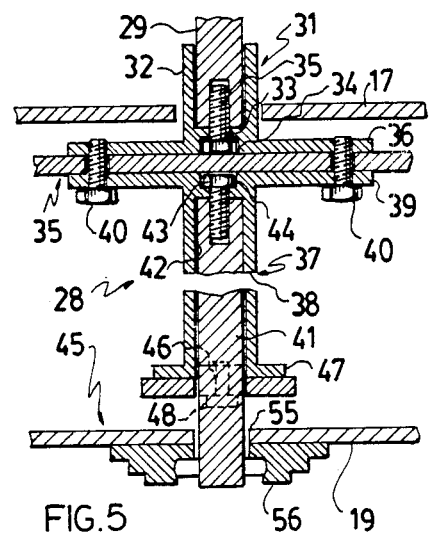
FIG.5
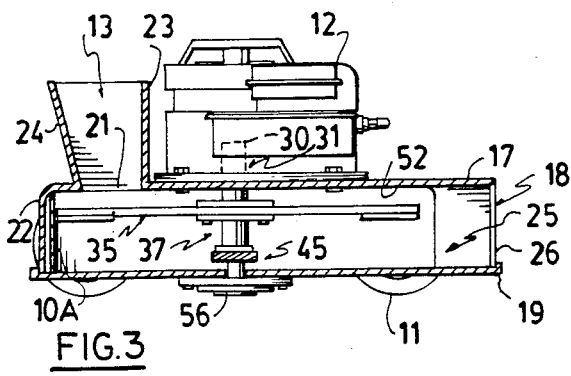
FIG.3
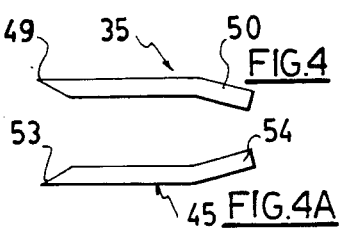
FIG.4
FIG.4A
FIG.6

PORTABLE SHREDDER/LAWN MOWER FOR GARDEN USE AND THE LIKE

BACKGROUND OF THE INVENTION

This invention relates to new and useful improvements in shredders, particularly relatively small shredders designed specifically for use in home gardens for relatively soft material such as leaves, hedge clippings, grass clippings, discarded plants and flowers and other soft refuse, and including means for selectively converting same for use as a lawnmower.

Conventionally, such shredders attempt to provide sufficient power to chip branches, and other heavy material. In order to accomplish this, they often include stationary breaker bars or projections within the enclosure in order to provide a shearing action for rotating blades and the like. However, these are usually unsatisfactory because they readily jam as heavy material becomes trapped between the rotating parts and the stationary breaker bars so that either the breaker bars and blades or both become bent, unbalancing the rotating parts and often causing further damage within the enclosure as well as to the source of power.

Such machines are often relatively heavy and are difficult to move from one location to the other. They are further without the capability for conversion for use as a lawnmower.

PRIOR ART

The following patents are known to applicant.

U.S. Pat. No. 2,756,001—L. N. Kemp—July 24, 1956. This invention discloses a soil and compost shredder of the transversely situated hammermill type rotor.

U.S. Pat. No. 3,153,435—H. C. Ober—Oct. 20, 1964. This also shows a transversely situated hammer mill type motor which is belt driven.

U.S. Pat. No. 3,240,247—R. D. Lautzenheiser—Mar. 15, 1966. This shows vertically mounted blades in a shredder housing.

U.S. Pat. No. 3,412,770—H. F. Johnson—Nov. 16, 1968. This patent discloses horizontally rotating fixed, and sharpened flails.

U.S Pat. No. 3,593,930—R. D. Lautzenheiser—July 20, 1971. The blades of this invention are situated parallel to one another and not at 90° mounted on a combination spacer coupling.

U.S. Pat. No. 3,674,220—Tupper et al—July 4, 1972. This is a commercial type chipper shredder and includes a chipping knife and shredder flails so that it operates similarly to a hammermill only rotating in a horizontal plane.

U.S. Pat. No. 4,360,166—Biersack—Nov. 23, 1982. This patent discloses a rotating blade assembly which inclines upwardly and outwardly into the base of the feed hopper.

U.S. Pat. No. 4,477,029—Green—Oct. 16, 1984. Once again the blades extend upwardly and outwardly into the base of the feed hopper.

Both of the latter two patents utilize a single blade assembly, and none of the above patents allow selective conversion for use as a lawnmower.

The present invention overcomes these disadvantages by providing a device which is designed primarily for relatively lightweight use in a home garden for soft refuse yet which at the same time provides an efficient shredding and mulching machine enabling such refuse to be chopped finely enough to be incorporated back into the garden if desired, and is also readily converted for use as a lawnmower if desired.

The design does not incorporate any stationary parts against which the blades attempt to shear the material and because the intake chute is relatively small, overloading is prevented.

One aspect of the invention is therefore to provide a shredder for relatively soft garden refuse and the like comprising in combination a substantially rectangular frame having an upper plate, a vertical surrounding wall and a base plate substantially spaced and parallel to said upper plate, an internal, cylindrical blade enclosure within said frame, an intake chute on one side of said internal enclosure adjacent the upper side thereof and communicating through said wall and a discharge chute on the other side of said internal, enclosure and also communicating through said wall on the opposite side of said frame to said intake chute, a source of power mounted on said upper plate with a substantially vertical drive shaft extending downwardly therefrom, at least two shredder blade assemblies in said internal enclosure and means mounting said shredder blade assemblies to said drive shaft for rotation in a substantially horizontal plane within said internal enclosure, and in sapced apart relationship, one adjacent the underside of said upper plate and the other adjacent the upper side of said lower plate.

A still further aspect of the invention includes a garden implement for selective use as a shredder for relatively soft garden refuse and the like, and a lawn mower, said implement comprising in combination a substantially rectangular frame including an upper plate, a vertical surrounding wall and a base assembly substantially spaced and parallel to said upper plate, and internal cylindrical blade enclosure within said frame, a refuse intake chute on one side of said internal enclosure adjacent the other side thereof and communicating through said wall and a discharge chute on the other side of said internal enclosure and also communicating through said wall on the opposite side of said frame to said intake chute, a source of power mounted on said upper plate with a substantially vertical drive shaft extending downwardly therefrom, at least two blade assemblies in said internal enclosure and means mounting said blade assemblies to said drive shaft for rotation in a substantially horizontal plane within said internal enclosure and in spaced apart relationship one with the other, one blade assembly being adjacent the underside of said upper plate and the other blade assembly being adjacent the upper side of said base assembly, said base assembly supporting said drive shaft by the lower end thereof, said base assembly being selected from the group consisting of a base plate detachably securable to said surrounding wall with a bearing assembly centrally thereof supportingly engageable by said drive shaft; and a plurality of stabilizer rods extending radially from a further bearing assembly supportingly engageable by said drive shaft and selectively detachably securable to said surrounding wall, said implement being adapted to be used as a shredder when said base plate and said bearing assembly is detachably secured to said surrounding wall and as a lawn mower when said stabilizer rods and said further bearing assembly is detachably secured to said surrounding wall in place of said base plate.

A further advantage of the invention is to provide means on the blades to draw air through the feed chute to minimize any throwback of material and also to help keep material from building up on the base of the machine as will hereinafter be described.

Another advantage of the invention is to provide a device which requires a relatively small source of power either in the form of a gas engine or an electric motor. In conjunction with the relatively small size of the source of power, the frame is wheel mounted with height adjustments and is provided with a handle assembly so that the overall shredder is similar in size and weight to a small lawnmower and is readily convertible to such use when desired.

Another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is an isometric view of the preferred embodiment of the device.

FIG. 2 is a top plan view of the machine with the source of power and handle assembly removed for clarity.

FIG. 3 is a transverse cross sectional view substantially along the line 3—3 of FIG. 2.

FIG. 4 is an end view of the upper blade per se.

FIG. 4A is an end view of the lower blade per se.

FIG. 5 is an enlarged fragmentary cross sectional view substantially along the line 5—5 of FIG. 2.

FIG. 6 is an isometric view of the spacer coupling per se.

In the drawings like characters of reference indicate corresponding parts in the different figures.

DETAILED DESCRIPTION

Figure 7:
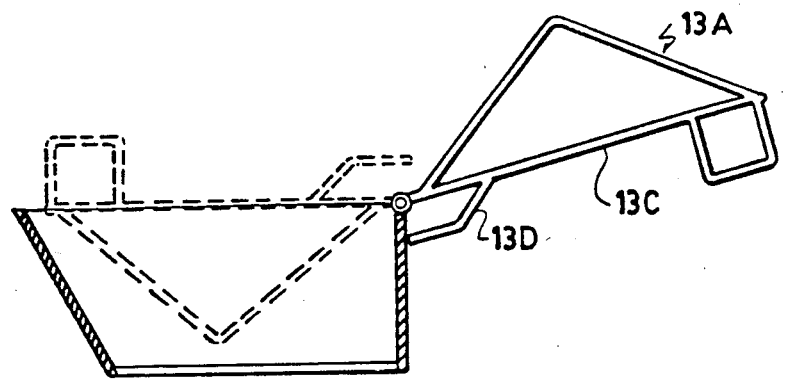
FIG. 7 is a fragmentary front elevation of the intake chute portion.

Proceeding therefore to describe the invention in detail, reference should first be made to FIG. 1 in which 10 illustrates generally, a substantially rectangular frame mounted upon the four ground engaging wheels 11, one adjacent each corner of the frame with conventional height adjusters shown schematically at 11A and having an internal, cylindrical blade enclosure 10A secured within the frame 10.

A source of power in the form of a small gasoline engine is indicated at 12 although an electric motor of sufficient power can of course be substituted. This source of power is preferably situated on raised mounts (not illustrated) located on the upper plate 17.

An intake chute 13 is provided at one side of the frame and a discharge chute 14 is provided at the other side of the frame, both communicating with the interior of the internal enclosure.

A handle assembly collectively designated 15 extends upwardly from brackets 16 secured to the upper side of the frame 10.

In detail, the frame includes an upper plate 17, a substantially vertical surrounding wall 18 and a lower or base plate 19 spaced and parallel to the upper plate 17.

Figure 8:
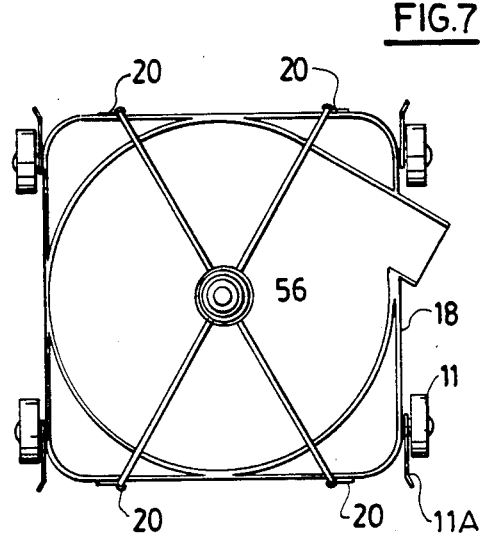
FIG. 8 is an underside plan view showing the device when converted for use as a lawnmower.

This lower plate is preferably detachable and is held in position by means of conventional resilient clip assemblies 20 upon opposite sides of the frame and against the vertical wall 18. Preferably, these are located as shown in FIG. 8 as will hereinafter be described.

The intake chute 13 communicates with the interior of the enclosure 10A through an aperture 21 formed in the upper plate 17 adjacent one side 22 of the assembly and is provided with three substantially vertical sides 23 and an inwardly and downwardly inclining front side 24. The dimensions of this intake chute and of the aperture 21 are such that only a controlled amount of debris can be fed into the machine at one time thus preventing overloading from occurring with the possible jamming of the blade assemblies mounted within the internal enclosure as will hereinafter be described.

A dislodge press/cover 13A is hinged to one side of the upper edge of the intake chute 13 and is formed of spaced and parallel bars 13B within surrounding frame 13C. This press/cover is substantially triangular in cross-sectional configuration and slightly smaller than the chute 13. It can act as a cover for the chute 13 and also as a press plate to dislodge refuse and debris lodged in the chute. When not in use it rests on a stop bracket 13D as shown in full line in FIG. 7.

A discharge chute collectively designated 25 is of square cross section and extends outwardly from the opposite side portion 26 of the annular wall 18. Once again this discharge chute 25 communicates with the interior of the internal enclosure through an opening 27 formed in the side portion 26 of the vertical wall 18.

The blade assemblies collectively designated 28 are shown in detail in FIG. 5 together with the method of connecting same to the lower end 29 of a vertically situated drive shaft 30 extending from the source of power 12, said drive shaft 30 being situated substantially centrally of the upper plate 17 of the frame and with minimum clearance (ideally approximately $\frac{1}{8}$") between the blade ends and the internal enclosure 10A.

A drive coupling 31 includes the upper central sleeve 32 which engages over the lower end 29 of the drive shaft and is held in position by means of a socket type bolt 33 situated within a recess 34, said bolt screw the readably engaging a screw threaded blind aperture 35 within the lower end 29 of the drive shaft 30.

The drive coupling includes horizontally extending arms in the form of flat strips 36 one upon each side of the lower end of the socket 32 and within the internal enclosure.

An upper blade collectively designated 35 is secured to the underside of this horizontal strip or member 36 as will hereinafter be described.

A spacer coupling collectively designated 37 includes a cylindrical sleeve 38 and an upper transverse strip or bar 39 corresponding in dimensions to the strip or plate 36 and the blade 35 is clamped between members 36 and 39 by means by screw threaded bolts 40 engaging through apertures in member 39, through corresponding apertures within the blade 35 and screw threadably engaging threaded apertures in the member 36.

Prior to the assembly of the upper blade 35 as hereinbefore described, a bearing shaft 41 is engaged within a bore 42 formed in the lower end of the spacer coupling 38 and is secured by a socket bolt 43 the head of which seats within a recess 44 in the upper end of the spacer coupling 37 in a manner similar to the bolt securing the drive coupling to shaft 30.

The lower blade assembly collectively designated 45 is secured by threaded bolts 46 to a further cross member 47 formed upon the lower end of the cylindrical portion 38 of the spacer coupling 37 and the arms of this lower member 47 extend upon each side of the sleeve 38 but are positioned radially by ninety degrees, to the upper member 39. Bolts 48, similar to bolts 40, engage through apertures within the blade 45 and screw threadably engage matching apertures within the arms 47.

The leading edges 49 of the outer end portions of the upper blade 35 are edge sharpened and the trailing edges 50 of these outer end portions are angulated downwardly as shown in FIGS. 3 and 4 so that with the blades rotating clockwise in the direction of arrow 51 with respect to FIG. 2, the sharpened leading edge strikes any debris and slices same and at the same time the downturned portions 50 draw air downwardly through the intake chute 13 and prevent any material from being blown upwardly therefrom. It will also be noted that this upper blade 35 is situated just below the undersurface 52 of the upper plate 17 of the frame 10.

The leading edges 53 of the outer portions of the lower blade 45 are also edge sharpened and the trailing edges of these portions are upturned as indicated by reference character 54 in FIG. 4A and these upturned ends prevent any debris from collecting below this lower blade assembly 45 and the base plate 19 and assist in ejecting it through the discharge chute 25.

The aforementioned bearing shaft 41 secured within sleeve 38 of the spacer coupling 37, extends through an aperture 55 within the base plate and is supported for rotation within a bearing assembly 56 secured centrally of the base plate 19 when the device is being used as a shredder.

However, when it is desired to convert the device to a lawnmower, the lower base plate 19 together with the bearing assembly 56 is removed from the frame and shaft 41 respectively, by disengaging the resilient clips 20.

Figure 9:
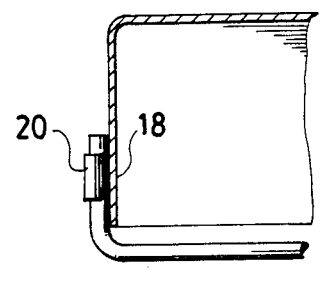
FIG. 9 is an enlarged fragmentary section of part of the wall of the frame showing one of the stabilizer rods secured to the wall with a resilient clip.
Figure 10:
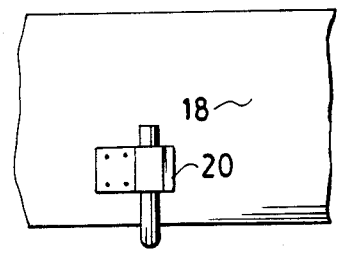
FIG. 10 is a side elevation of FIG. 9.
Figure 11:
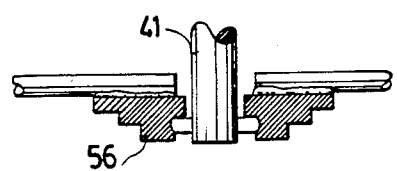
FIG. 11 is a fragmentary section of the bearing assembly with stabilizer rods extending therefrom.

A similar bearing assembly 20A is provided with four stabilizer rods 57 extending radially from the bearing assembly and these rods are selectively engagable with the resilient clips 20, upturned ends 58 being provided on the distal ends of the rods as shown in FIGS. 9 and 10. These rods support the bearing assembly 20A on the drive shaft 41 and prevent or reduce vibration, whipping and/or swaying of the drive shaft when used as a lawnmower. It will be noted that the clips 20 are positioned on fore and aft walls of the frame and diverge from the bearing assembly 56 to each side of the longitudinal or fore and aft axis of the frame in order to facilitate proper discharge of the grass clippings through the discharge chute 25. The lower most blade 45 acts as the a grass cutter and the upper blade 35 only facilitates discharge through the chute 25 and prevents clippings from being ejected through the refuse intake 13.

From the foregoing it will be appreciated that the machine is simply built and easily maintained designed specifically for the shredding of garden refuse to facilitate the ease of incorporating same back into the soil and, selectively, to be readily converted for use as a lawnmower. The machine is designed with the average home owner in mind as all parts are easily dismantled, maintained and reassembled.

The device consists of a relatively lightweight frame having an internal cylindrical enclosure therein, with a removable base plate, (for lawnmower conversion) having an internal cylindrical enclosure therein, a feed chute, a discharge chute, two shredder blades rotating horizontally and at right angles to one another and operated by a small gasoline engine electric motor. The material is fed in vertically, shredded on the horizontal, and then discharged horizontally through a rear chute. As described, the shredder is readily converted to a lawnmower by removing the bottom plate with the bearing assembly 20 and replacing same with stabilizer rods and a further bearing assembly 20A.

The machine is stable and, being relatively lightweight, is easy to store and has eliminated any baffles or breaker bars which can cause the blades to bend and hit the baffles if relatively hard material becomes jammed between the blades and stationary parts.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What is claimed:

1. A shredder for relatively soft garden refuse and the like comprising in combination a susbtantially rectangular frame having an upper plate, a vertical surrounding wall and a base plate substantially spaced and parallel to said upper plate, an internal, cylindrical blade enclosure within said frame, an intake chute on said internal enclosure adjacent the upper side thereof and communicating through said wall and a discharge chute on said internal enclosure and also communicating through said wall, a source of power mounted on said upper plate with a substantially vertical drive shaft extending downwardly therefrom, at least two shredder blade assemblies in said internal enclosure and measns mounting said shredder blade assemblies to said drive shaft for rotation in a substantially horizontal plane within said internal enclosure, and in spaced apart relationship, one adjacent the underside of said upper plate and the other adjacent the upper side of said lower plate, said means mounting said shredder blade assembly for rotation in a substantially horizontal plane to said drive shaft including a spacer coupling between said blades with said upper blade being detachably secured to the upper end of said spacer coupling and the lower blade being detachably secured to the lower end of said coupling and means securing said coupling to said drive shaft whereby said coupling and said blades rotate therewith, ground engaging wheels mounting said frame for ease of movement, a handle assembly extending upwardly and outwardly from one side of the said frame, and further means detachably securing said spacer coupling into said shaft, said further means including a drive coupling secured to the distal end of said drive shaft and extending into said internal blade enclosure substantially centrally through the upper plate of said frame, the upper end of said spacer coupling being secured to the lower end of said drive coupling with said upper blade being clamped therebetween, a bearing shaft being secured axially to said spacer coupling and extending downwardly therefrom and a bearing assembly in said base plate, the lower end of said bearing shaft being supported for rotation within said bearing assembly.

2. The shredder according to claim 1 in which said blade assemblies each include an elongated flat strip with the leading edges of at least the outer end portions of said strip being edge sharpened, said blades being secured to said drive shaft at substantially ninety degrees radially from one another.

3. The shredder according to claim 2 in which at least the outer end portion of said upper blade is provided with a downturned trailing edge, and at least said outer end portion of said lower blade is provided with an upturned trailing edge.

4. The shredder according to claim 1 in which said base plate is detachable from said frame to provide access to the interior of said internal blade enclosure.

5. The device according to claim 1 which includes means to selectively convert said shredder to a lawnmower and vice versa, said last mentioned means including a further bearing assembly for supporting said bearing shaft and a plurality of stabilizer rods secured to said bearing assembly by one end thereof and extending radially therefrom, said further bearing assembly and said stabilizer rods being substituted for said base plate and said firstmentioned bearing assembly, and means on said vertical surrounding walls selectively retaining said base plate and/or said stabilizer rods to the underside of said surrounding mower, said bearing shaft selectively engaging one of said bearing assemblies.

6. The device according to claim 5 in which said means on said vertically situated wall selectively retaining said base plate and/or said stabilizing rods includes a plurality of resilient clips, and upturned ends formed on the other ends of said stabilizer rods selectively engagable with said resilient clips, said ground engaging wheels being adjustable in height relative to said frame.

7. The shredder according to claim 5 in which said blade assemblies each include an elongated flat strip with the leading edges of at least the outer end portions of said strip edge sharpened, said blades being secured to said drive shaft at substantially ninety degrees radially from one another.

8. The shredder according to claim 6 in which said blade assemblies each include an elongated flat strip with the leading edges of at least the outer end portions of said strip edge sharpened, said blades being secured to said drive shaft at substantially ninety degrees radially from one another.

9. The shredder according to claim 5 in which at least the outer end portion of said upper blade is provided with a downturned trailing edge, and at least said outer end portion of said lower blade is provided with an upturned trailing edge.

10. The shredder according to claim 6 in which at least the outer end portion of said upper blade is provided with a downturned trailing edge, and at least said outer end portion of said lower blade is provided with an upturned trailing edge.

11. A garden implement for selective use as a shredder for relatively soft garden refuse and the like, and a lawnmower, said implement comprising in combination a substantially rectangular frame including an upper plate, a vertical surrounding wall and a base assembly substantially spaced and parallel to said upper plate, and internal cylindrical blade enclosure within said frame, a refuse intake chute on one side of said internal enclosure adjacent the other side thereof and communicating through said wall and a discharge chute on the other side of said internal enclosure and also communicating through said wall on the opposite side of said frame to said intake chute, a source of power mounted on said upper plate with a substantially vertical drive shaft extending downwardly therefrom, at least two blade assemblies in said internal enclosure and means mounting said blade assemblies to said drive shaft for rotation in a substantially horizontal plane within said internal enclosure and in spaced apart relationship one with the other, one blade assembly being adjacent the underside of said upper plate and the other blade assembly being adjacent the upper side of said base assembly, said base assembly supporting said drive shaft by the lower end thereof, said base assembly being one of a base plate detachably securable to said surrounding wall with a bearing assembly centrally thereof supportingly engageable by said drive shaft; and a plurality of stabilizer rods extending radially from a further bearing assembly supportingly engageable by said drive shaft and selectively detachably securable to said surrounding wall, said implement being adapted to be used as a shredder when said base plate and said bearing assembly is detachably secured to said surrounding wall and as a lawnmower when said stabilizer rods and said further bearing assembly is detachably secured to said surrounding wall in place of said base plate.

12. The implement according to claim 11 in which said blade assemblies each include an elongated flat strip with the leading edges of at least the outer end portions of said strip being edge sharpened, said blades being secured to said drive shaft at substantially ninety degrees radially from one another.

13. The implement according to claim 12 in which at least the outer end portion of said upper blade is provided with a downturned trailing edge, and at least said outer end portion of said lower blade is provided with an upturned trailing edge.

14. The implement according to claim 11 in which said means mounting said shredder blade assembly for rotation in a substantially horizontal plane to said drive shaft includes a spacer coupling between said blades with said upper blade being detachably secured to the upper end of said spacer coupling and the lower blade being detachably secured to the lower end of said coupling and means securing said coupling to said drive shaft whereby said coupling and said blades rotate therewith, wheels mounting said frame for ease of movement and a handle assembly extending upwardly and outwardly from one side of said frame.

15. The implement according to claim 12 in which said means mounting said shredder blade assembly for rotation in a substantially horizontal plane to said drive shaft includes a spacer coupling between said blades with said upper blade being detachably secured to the upper end of said spacer coupling and the lower blade being detachably secured to the lower end of said coupling and means securing said coupling to said drive shaft whereby said coupling and said blades rotate therewith, wheels mounting said frame for ease of movement and a handle assembly extending upwardly and outwardly from one side of said frame.

16. The implement according to claim 13 in which said means mounting said shredder blade assembly for rotation in a substantially horizontal plane to said drive shaft includes a spacer coupling between said blades with said upper blade being detachably secured to the upper end of said spacer coupling and the lower blade being detachably secured to the lower end of said coupling and means securing said coupling to said drive shaft whereby said coupling and said blades rotate therewith, wheels mounting said frame for ease of movement and a handle assembly extending upwardly and outwardly from one side of said frame.

17. The implement according to claim 14 which includes further means detachably securing said spacer coupling into said shaft, said further means including a drive coupling secured to the distal end of said drive shaft and extending into said internal blade enclosure substantially centrally through the upper plate of said frame, the upper end of said spacer coupling being secured to the lower end of said drive coupling with said upper blade being clamped therebetween, a bearing shaft being secured axially to said spacer coupling and extending downwardly therefrom and a bearing assembly in said base plate, the lower end of said bearing shaft being supported for rotation within said bearing assembly.

18. The implement according to claim 15 which includes further means detachably securing said spacer coupling into said shaft, said further means including a drive coupling secured to the distal end of said drive shaft and extending into said internal blade enclosure substantially centrally through the upper plate of said frame, the upper end of said spacer coupling being secured to the lower end of said drive coupling with said upper blade being clamped therebetween, a bearing shaft being secured axially to said spacer coupling and extending downwardly therefrom and a bearing assembly in said base plate, the lower end of said bearing shaft being supported for rotation within said bearing assembly.

19. The implement according to claim 16 which includes further means detachably securing said spacer coupling into said shaft, said further means including a drive coupling secured to the distal end of said drive shaft and extending into said internal blade enclosure substantially centrally through the upper plate of said frame, the upper end of said spacer coupling being secured to the lower end of said drive coupling with said upper blade being clamped therebetween, a bearing shaft being secured axially to said spacer coupling and extending downwardly therefrom and a bearing assembly in said base plate, the lower end of said bearing shaft being supported for rotation within said bearing assembly.

* * * * *